(12) United States Patent
Budd-Jack et al.

(10) Patent No.: US 8,908,836 B2
(45) Date of Patent: Dec. 9, 2014

(54) CALL CENTER SYSTEM WITH GRAPHICAL USER INTERFACE AND METHOD OF OPERATION THEREOF

(75) Inventors: Randy Budd-Jack, Mill Creek, WA (US); Greg Lee Bray, Renton, WA (US)

(73) Assignee: Zetron, Inc., Redmond, WA (US)

( * ) Notice: Subject to any disclaimer, the term of this patent is extended or adjusted under 35 U.S.C. 154(b) by 290 days.

(21) Appl. No.: 13/414,541

(22) Filed: Mar. 7, 2012

(65) Prior Publication Data

US 2012/0263280 A1  Oct. 18, 2012

Related U.S. Application Data

(60) Provisional application No. 61/476,742, filed on Apr. 18, 2011.

(51) Int. Cl.
*H04M 11/00* (2006.01)
*H04M 3/51* (2006.01)

(52) U.S. Cl.
CPC ...... *H04M 3/5183* (2013.01); *H04M 2203/256* (2013.01); *H04M 2201/42* (2013.01)
USPC .......................................................... 379/45

(58) Field of Classification Search
CPC . H04M 11/04; H04M 2242/04; H04M 3/436; H04M 3/5116; H04M 3/5125; H04M 3/5113; H04M 3/5141; H04M 3/5175; H04M 3/5183
USPC ................................ 379/45, 37, 267, 265.09
See application file for complete search history.

(56) References Cited

U.S. PATENT DOCUMENTS

| | | | |
|---|---|---|---|
| 7,436,937 | B2 | 10/2008 | Clawson |
| 7,684,782 | B2 | 3/2010 | Ashley, Jr. et al. |
| 7,783,013 | B2 | 8/2010 | Laliberte |
| 7,817,796 | B1 | 10/2010 | Clippinger et al. |
| 7,957,520 | B2 | 6/2011 | Vadlakonda et al. |
| 7,962,644 | B1 | 6/2011 | Ezerzer et al. |
| 2010/0227583 | A1* | 9/2010 | Roy et al. .................. 455/404.1 |
| 2011/0016402 | A1* | 1/2011 | Dailey .......................... 715/738 |

\* cited by examiner

*Primary Examiner* — Stella Woo
(74) *Attorney, Agent, or Firm* — Ishimaru & Associates LLP

(57) ABSTRACT

A method of operation of a call center system includes: providing an operator console having a display; instantiating an activation button, on the display of the operator console, including: coloring an activity frame around the activation button, selecting a selected network in the activation button, and presenting an inbound call window on the activation button; and activating a transmitting icon includes establishing a contextual awareness of interactive data elements and operational actions.

20 Claims, 9 Drawing Sheets

CALL CENTER SYSTEM WITH GRAPHICAL USER INTERFACE AND METHOD OF OPERATION THEREOF

CROSS-REFERENCE TO RELATED APPLICATION(S)

This application claims the benefit of U.S. Provisional Patent Application Ser. No. 61/476,742 filed Apr. 18, 2011, and the subject matter thereof is incorporated herein by reference thereto.

TECHNICAL FIELD

The present invention relates generally to a call center system, and more particularly to a system for managing a plurality of telephone and radio calls that require immediate response.

BACKGROUND ART

Centrally located call processing centers, or call centers, are a key part of service response processes. The level of technology integration and sophistication in portable phones has risen to the point where cell phones now incorporate digital cameras, voice annotation, email, calendaring, and appointment functions in a single package.

In some settings, however, technology has not had such a dramatic impact. For example, an emergency call center (e.g., a 911 call center) typically has limited technological resources that it can draw upon to handle emergency calls. Some call centers may only include a telephone interface to handle incoming calls, a radio dispatch interface to alert the relevant authorities, and a call routing system to direct incoming calls to the appropriate operators. As another example, an appliance maintenance hotline may include a telephone interface to handle incoming calls, a technician that responds to the telephone calls, and a pre-generated service manual stored on a local machine that the technician may consult while handling the call.

As a result, individuals often experience a frustrating disconnect between the capabilities associated with the devices they use on a daily basis, and services that they turn to for help or for information. In many instances, individuals have the capability to capture media that would greatly improve the service they could receive from a call center, but call centers are unprepared to accept and incorporate the media into their processes.

In order for emergency personnel to be dispatched to the correct location, the Automated Number Information (ANI) and Automatic Location Information (ALI) data is used for identifying a communication device from which said incoming call originated. Thus, when a portable IP communications device is moved from one geographic location to another, the geographic location information in the service provider's database should be updated.

Thus, a need still remains for a call center system with graphical user interface. In view of the increased reliance on telephone activates services, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a call center system including: providing an operator console having a display; instantiating an activation button, on the display of the operator console, including: coloring an activity frame around the activation button, selecting a selected network in the activation button, and presenting an inbound call window on the activation button; and activating a transmitting icon includes establishing a contextual awareness of interactive data elements and operational actions.

The present invention provides a call center system, including: an operator console having a display; a call exchange mechanism linked to the operator console, for delivering an inbound call; a logger, coupled to the operator console, for generating a call history; and a radio gateway, coupled to the operator console, for establishing an audio patch by the call exchange mechanism patched to the radio gateway.

Certain embodiments of the invention have other steps or elements in addition to or in place of those mentioned above. The steps or element will become apparent to those skilled in the art from a reading of the following detailed description when taken with reference to the accompanying drawings.

BEST MODE FOR CARRYING OUT THE INVENTION

Figure 1:
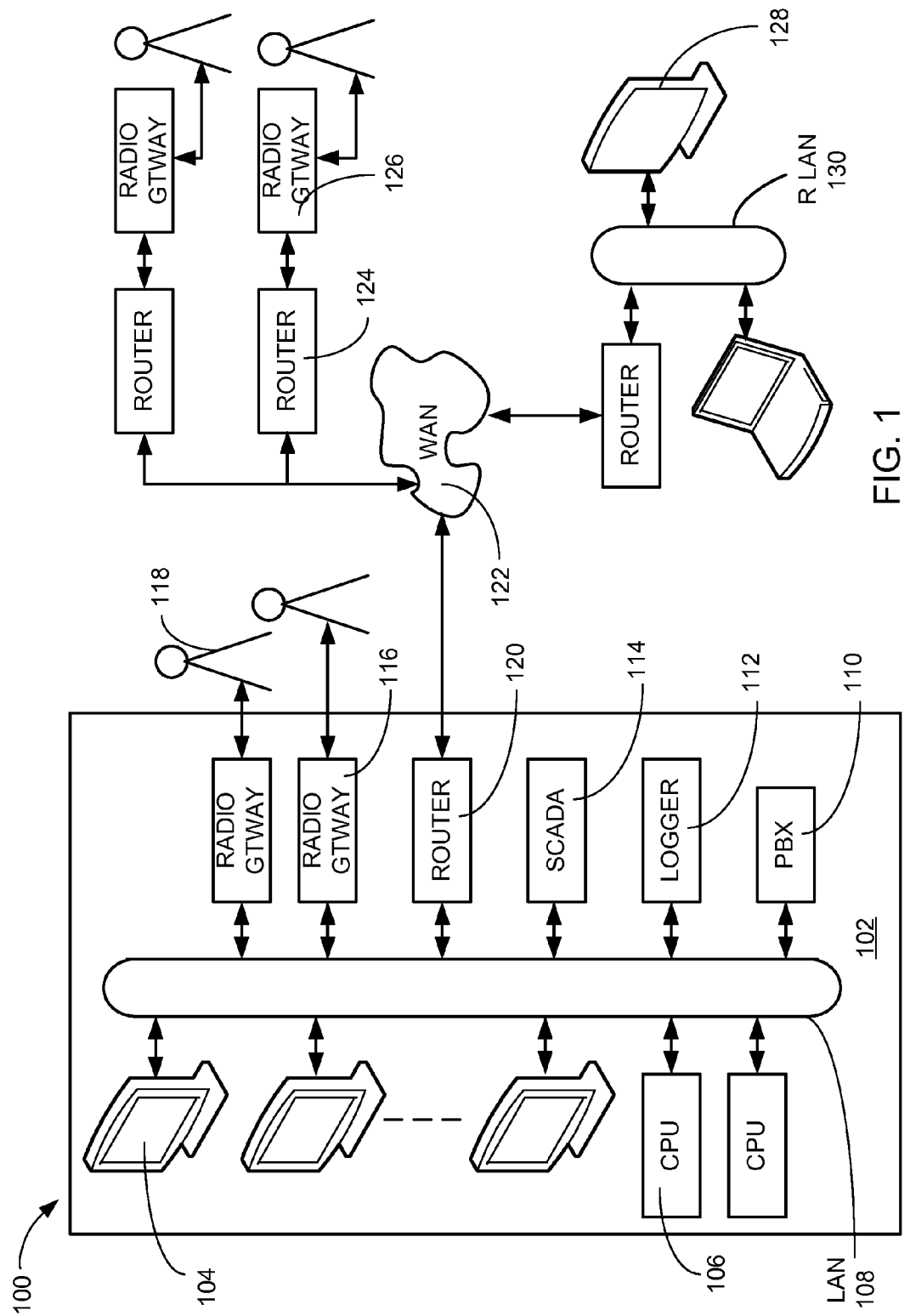
FIG. 1 is a functional block diagram of a call center system in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGS. Similarly, although the views in the drawings for ease of description generally show similar orientations, this depiction in the FIGS. is arbitrary for the most part. Generally, the invention can be operated in any orientation.

The same numbers are used in all the drawing FIGS. to relate to the same elements. The embodiments have been numbered first embodiment, second embodiment, etc. as a matter of descriptive convenience and are not intended to have any other significance or provide limitations for the present invention.

For expository purposes, the term "horizontal" as used herein is defined as a plane parallel to the plane or surface of a table, regardless of its orientation. The term "vertical" refers to a direction perpendicular to the horizontal as just defined. Terms, such as "above", "below", "bottom", "top", "side" (as in "sidewall"), "higher", "lower", "upper", "over", and "under", are defined with respect to the horizontal plane, as shown in the figures.

The term "module" referred to herein can include software, hardware, or a combination thereof. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

The term "processing" as used herein includes presenting an incoming call, accepting a communication task, providing an outbound communication, coordinating external resources, and logging the communication of a caller and the external resources.

The call center system includes a User Interface (UI) running on computer systems in a distributed fashion. An operator using the console position is often in a high stress environment (e.g. 9-1-1 center) and controls are implemented in a manner to reduce complexity and distraction as compared to the current industry equipment.

Contextual awareness as used herein is defined as presenting interactive data elements and operational actions that are valid given the current situation and operational workflow.

Associative navigation is defined as a method of traversing the relationships between elements to determine a data element or operational point.

Contextual Workflow is defined as a method of using data gathered from prior contextual events to automatically traverse relevant associated navigation paths to provide interactive data elements and operational actions including a dynamic presentation via a multi-layered association graph.

When an emergency alert is received by the call center system it generates contextual awareness that is propagated to all associated system elements whose association type has an interest in emergency alerts. Each of the system elements integrates the emergency alert context into its current visual representation and control display. Associated data elements of interest or use during an alert may also be integrated into the element's interface.

As an example, a police officer in the field can press the emergency alert button on his mobile radio. In response, the emergency alert can be displayed on the control display of the receiving fixed station. The identity of the operator of the mobile radio is determined and the emergency alert indication is added to the control display indicated as a radio situation. The police officer's personal contact card is updated with an outstanding emergency alert condition. Associated with emergency alert the control interface is updated with, the identification of the officer, the officer's partner, their assigned patrol car, and patrol route. This information helps form the contextual awareness of the emergency alert. Since the most likely response to an emergency alert is to acknowledge it and send backup or to clear a false alarm, the contextual workflow can update the control options to allow for immediate access to these options. In addition the behavior of some of the existing operations, such as a directed instant transmit, can be modified by the contextual workflow to provide an intuitive integration with the emergency alert.

An operational premise of the call center system provides that information is not presented or actionable until a context or choice makes it relevant. The generation of contextual awareness by processing contextual data is reflected in the implementation by both what is presented on the control display and what remains out of view but is still accessible by the operator through a configuration process.

A method for providing contextual workflow within an operational control, dispatch, or call system provides the an operator co-located with a control console can be presented with associated interactive data elements and operational actions, as determined by the comparison of a multi-layered association graph displayed on the control console representing both the static and dynamic relationships between data elements within an operational context.

In an operational control, dispatch, or call system having a plurality of operators and operations consoles, a method for presenting a contextual workflow includes receiving operational data elements and evaluating the data elements to provide a contextual awareness of the data elements. This can be achieved by presenting informational indicators, that only display contextually related indications and removing from the visual presentation of indicators that are not configured in the contextual awareness. The plurality of operators can individually configure operational controls that are based on the contextual association of the data element to the situational workflow.

Referring now to FIG. 1, therein is shown a functional block diagram of a call center system 100 in an embodiment of the present invention. The functional block diagram of the call center system 100 depicts a call center 102 having several units of an operator console 104 coupled to a central processing unit 106 through a local area network (LAN) 108. The central processing unit 106 can be part of a redundant pair of the central processing unit 106. The central processing unit 106 can maintain a local data base of external resources or call history (not shown).

The call center system 100 employs an automatic call distribution (ACD) engine that is tightly integrated with a highly configurable interactive voice response (IVR) system that can be executed on the central processing unit 106. Additionally, configuration tools allow each public safety access point (PSAP) or the call center 102 to tailor the call routing and IVR behaviors on the central processing unit of each site to meet the business needs.

The call center system 100 integrates a call history feature provided by a logger 112, that can be triggered on an incoming call, in order to provide a contextual awareness of the call originator or situation. When triggered the system launches a simultaneous query to multiple database (DB) sources. One source is a local DB cache, stored in the central processing unit 106, with up to 60 GB of records on a high performance solid state drive. The other sources can either be local or remote. The system can typically provide any available call history with the call if it is contained in the local cache. If no records are found after a configurable timeout period, that information is made available to the operator that accepted the call. Any retrieved information can be made available to the call taker as additional call notes.

Emergency alerts are one example of the process being applied. When activated from the field a new emergency alert becomes part of the operational context of a fixed station resource that received the report or incoming call, the mobile device that generated the alert, and the contact that initiated the alert from the field.

The visual representation and operational control options are then updated to incorporate the new context as well as the visuals/control of all associated elements that can participate in an emergency alert. The playback of activity where it is possible to initiate playback of audio and events based on the context generated by the alert without separately accessing an independent audio player.

The local area network 108 can also be coupled to a call exchange mechanism 110, such as an SIP gateway or FX gateway, which is an electronic device that provides telephone and radio access to the resources of the call center 102. The telephone access can include analog, voice over internet protocol (VOIP), optical cable communication, or cellular. The logger 112, is a call recording mechanism, can be used to record all aspects of transactions between the operator console 104 and the call exchange mechanism 110 for later analysis. A supervisory control and data acquisition (SCADA) unit 114 can be used to monitor the performance and utilization of the resources in the call center 102. The supervisory control and data acquisition unit 114 provides predictive analysis of the performance of all elements in the call center 102.

A radio gateway 116 can be coupled to the operator console 104 through the local area network 108. The operator console 104 can utilize the radio gateway 116 to drive a transceiver 118 in order to communicate with external resources (not shown). A local router 120, coupled to the local area network 108, can provide access to a wide area network (WAN) 122. The wide area network 122 can extend over expansive regions while the local area network 108 only exists within the call center 102. The wide area network 122 provides access through a remote router 124 to a remote radio gateway 126 or a remote operator console 128 coupled to a remote local area network 130.

In the operation of the call center 102, a call can be offered by the call exchange mechanism 110 to the operator console 104. The acceptance of the call can trigger the logger 112 to record all aspects of the call accepted by the operator console 104.

Figure 2:
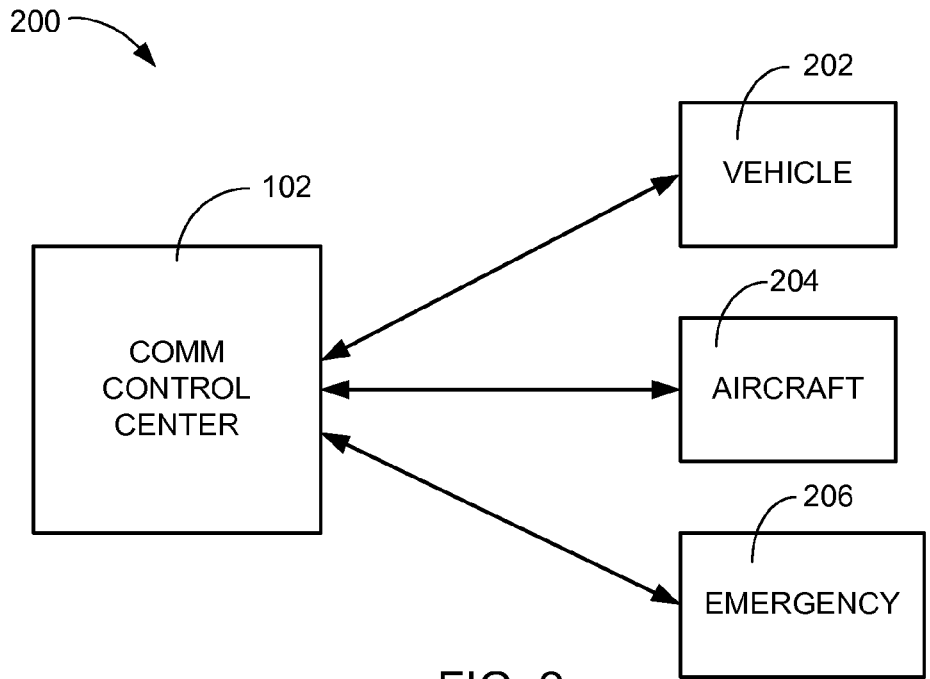
FIG. 2 is a functional block diagram of an application of the call center system of FIG. 1.

Referring now to FIG. 2, therein is shown a functional block diagram of an application 201 of the call center system 100, of FIG. 1. The functional block diagram of the application 201 depicts the call center 102 having a radio communication to a vehicle 202, such as a taxi, an ambulance, or a police car. The call center 102 can also communicate with an aircraft 204. The aircraft 204 can be used in conjunction with the vehicle 202 under coordination of the call center 102. The aircraft 204 may be used for police, fire, rescue, or transportation support of the objectives of the call center 102. The call center 102 can also communicate with emergency services 206.

While an application of the call center system 100 is the coordination of the emergency services 206, such as fire, police, and rescue, other applications of the call center system 100 are also possible. The call center system 100 can be applied to the coordination of transportation systems to utilize the vehicle 202 and the aircraft 204, such as taxi and airline services.

Figure 3:
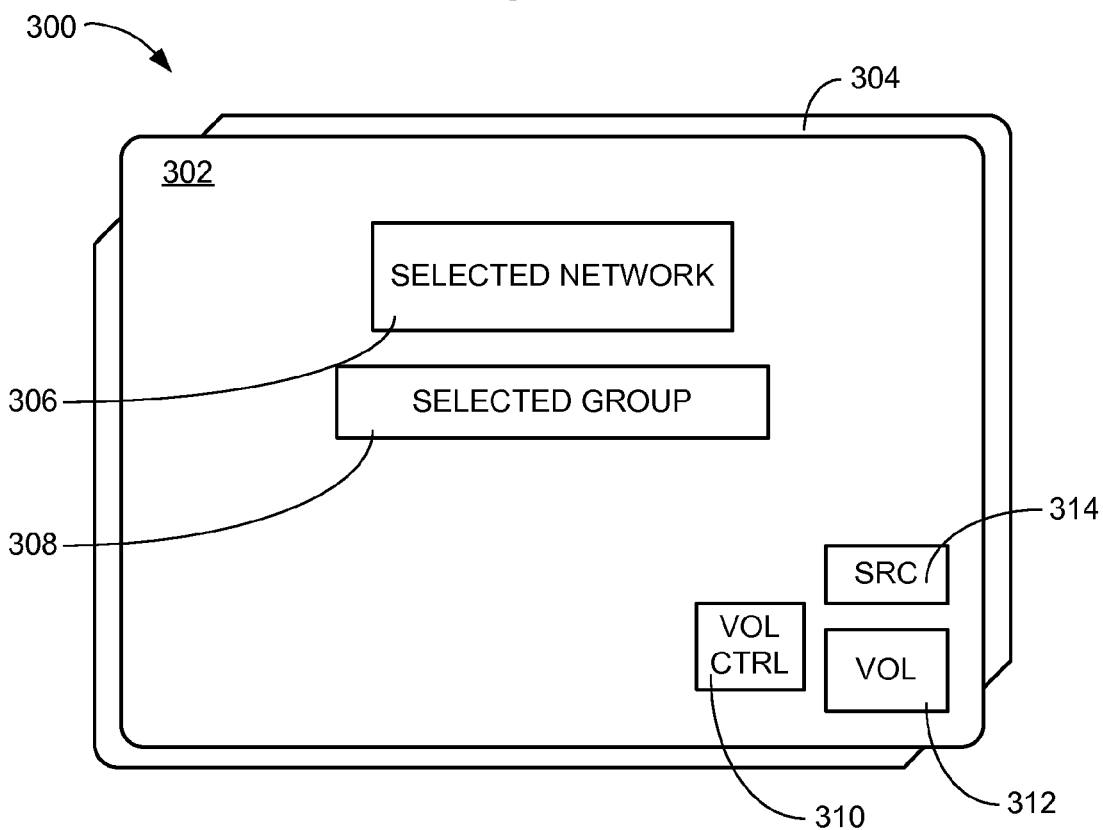
FIG. 3 is an exemplary display of a station channel icon display as displayed by the call center system of FIG. 1 in an idle state of operation.

Referring now to FIG. 3, therein is shown an exemplary display of a station channel icon display 301 as displayed by the call center system 100, of FIG. 1 in an idle state of operation. The exemplary display of the station channel icon display 301 depicts an activation button 302, which can be bordered by an activity frame 304. The activity frame 304 can change colors to indicate activity status of the activation button 302. By way of an example, the activity frame can be dark blue during idle periods, green during active periods, light blue during periods of interest, and red during emergency operations.

The color of the activity frame 304 can assist in maintaining the attention of an operator can be concurrently managing several of the station channel icon display 301. A selected network 306 can represent the network monitored by that particular instance of the station channel icon display 301. Within the selected network 306 there can be a selected group window 308, such as a talking group of a certain specialty or region. The selected group window 308 can be changed through a configuration process in order to support the goals of the call center 102, of FIG. 1.

A volume control 310 can be positioned in a corner of the activation button 302. The volume control 310 can be displayed as a plus sign, a minus sign, or the combination of both. A volume display 312 can be adjacent to the volume control 310 and indicate a numerical value indicative of the relative loudness or volume of the audio devices (not shown) used in conjunction with the operator console 104, of FIG. 1. A source button 314 can be exercised to select which audio device will be used by the operator console 104. The source button 314 can activate audio devices such as the speakers of the operator console 104, a head set associated with the operator console 104, or a transcription device that can be displayed on the operator console 104.

It has been discovered that minimizing the information displayed in the activation button 302 can help an operator (not shown) make rapid decisions based on a small set of visual queues. The utilization of the activity frame 304 allows the operator to pay attention to the activation button 302 as required. The visual queues of changing the color of the activity frame 304 assists in bringing the attention of the operator to the activation button 302 only as required.

Figure 4:
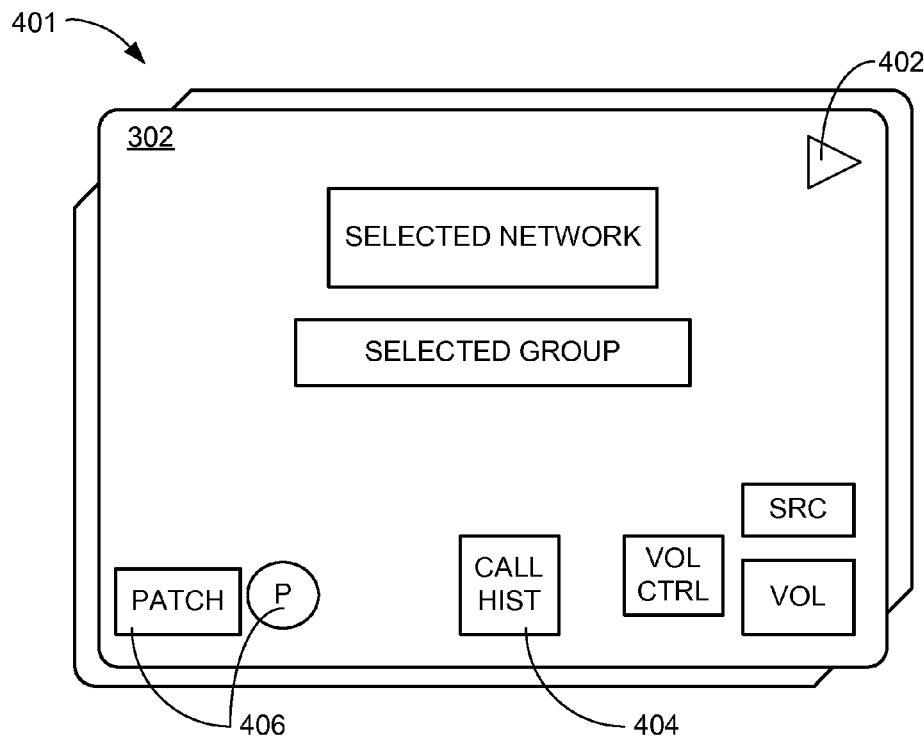
FIG. 4 is an exemplary display of a station channel icon display as displayed by the call center system of FIG. 1 in a nominated state of operation.

Referring now to FIG. 4, therein is shown an exemplary display of a station channel icon display 401 as displayed by the call center system 100 of FIG. 1 in a nominated state of operation. The exemplary display of the station channel icon display 401 depicts the activation button 302 having a pending call, which can be accepted or declined by the operator (not shown).

A configuration button 402 can be displayed in order for the operator to make adjustments in the processing of the call. A call history button 404 can be used to display information about the pending call or how it will be processed.

A patch button 406 can be displayed in the corner of the activation button 302. The patch button 406 can be represented by circle containing the letter "P". Accessing the patch button 406 can establish a communication link between the received call and an external resource.

Figure 5:
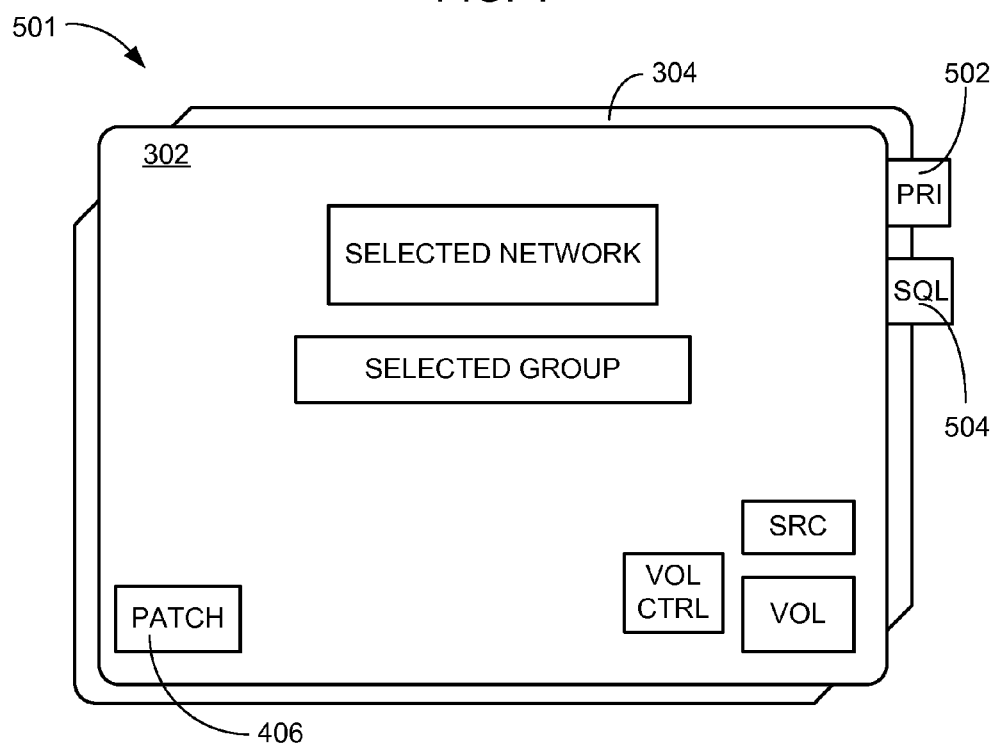
FIG. 5 is an exemplary display of a station channel icon display as displayed by the call center system of FIG. 1 in an activated patch and marker state of operation.

Referring now to FIG. 5, therein is shown an exemplary display of a station channel icon display 501 as displayed by the call center system 100, of FIG. 1, in an activated patch and marker state of operation. The patch button 406 can be brightly illuminated, change colors, have a numerical indicator, or a combination thereof to indicate that the channel is in patch mode. A priority marker 502 can be positioned to obscure a portion of the activity frame 304 and extending to the right side of the activation button 302. The priority marker 502 can indicate a transition in the state of the activation button 302.

A squelch disable marker 504 can also be displayed adjacent to the priority marker 502. The squelch disable marker 504 indicates that the audio source selected in the activation button 302 cannot be disabled. Clicking either the priority marker 502 or the squelch disable marker 504 will reset them to their default state and disable the functions. The default state of the features accessed through the activation button 302 are selected by an administrator (not shown) as the beginning state of the features. The single click deactivation of the priority marker 502 and the squelch disable marker 504 can simplify the use of the operator console 104, of FIG. 1. The single click operation can return any active marker to the default inactive state. The activation button 302 only presents markers or functions that are not in their default state.

Figure 6:
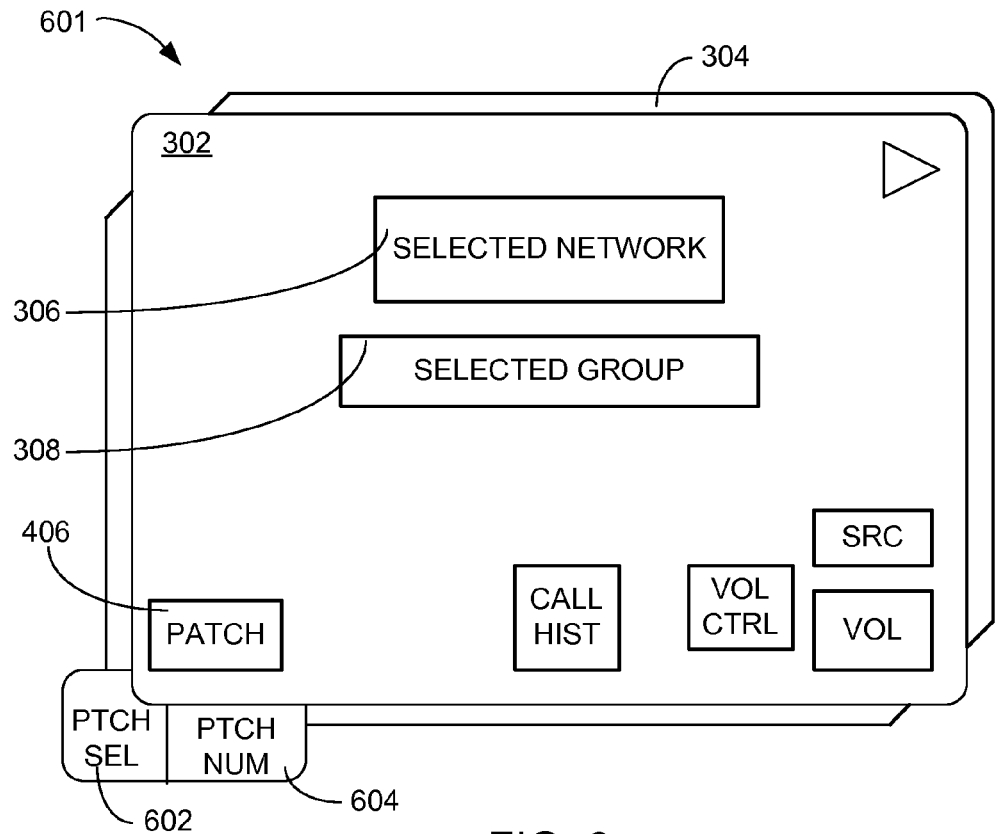
FIG. 6 is an exemplary display of a station channel icon display as displayed by the call center system of FIG. 1 in a single channel patched state of operation.

Referring now to FIG. 6, therein is shown an exemplary display of a station channel icon display 601 as displayed by the call center system 100 of FIG. 1 in a single channel patched state of operation. The exemplary display of the station channel icon display 601 depicts the activation button 302 having a patch select button 602 and a patch number selector 604 extended below the patch button 406. A single button click allows the re-configuration of a patch to the channel.

The patch button 406 can indicate patch affecting options of the active patch and an associated number of the patch. Patches can be added, deleted, or changed with a single button click. This strategy simplifies the operation. Changes in the state of the channel due to activating or removing a patch can also alter the condition of the activity frame 304 as a prompt of the status of the channel.

It is understood that the channel is the term used to mean the selected group window 308 communication on the selected network 306. It is further understood that a channel can have multiple patches in order to communicate with multiple external resources, such as fire and police resources for coordinated communication.

The patch select button 602 provides a global patch controls for the operator console 104, of FIG. 1. The forming of a patch directly ties the caller of an inbound call to an appropriate resource, such as police, fire department, or emergency medical services. While the operator can continue to monitor the communication, further interaction with the caller is not usually necessary.

The operator can establish multiple patches sequentially as required to coordinate resources that will respond to the inbound call. All patch controls for each patch in the system are available through the patch button 406. The operator can see the list of patch members for each patch. They can also remove members right from the patch select button 602.

The patch button 406 can initiate an audio patch between two or more parties. The context associated with the audio patch is propagated to all system elements whose association type has an interest in audio patches.

Each of the system elements integrates the audio patch context into its current visual representation and control display. Any associated data elements of interest or use to the system elements during an audio patch are integrated into the system element's interface.

As an example, a police officer in the field can request to be connected to a party reachable by phone. The operator can initiate a patch between the officer and the requested party. Using the associated audio contact methods, a new audio patch can be created between the two parties. If any of the parties is not already connected, a call can be placed to the party to be connected via phone, then a connection attempt can be initiated. The operator can then add additional members, by either resource or personal contact card, to the patch using the existing patching context.

Figure 7:
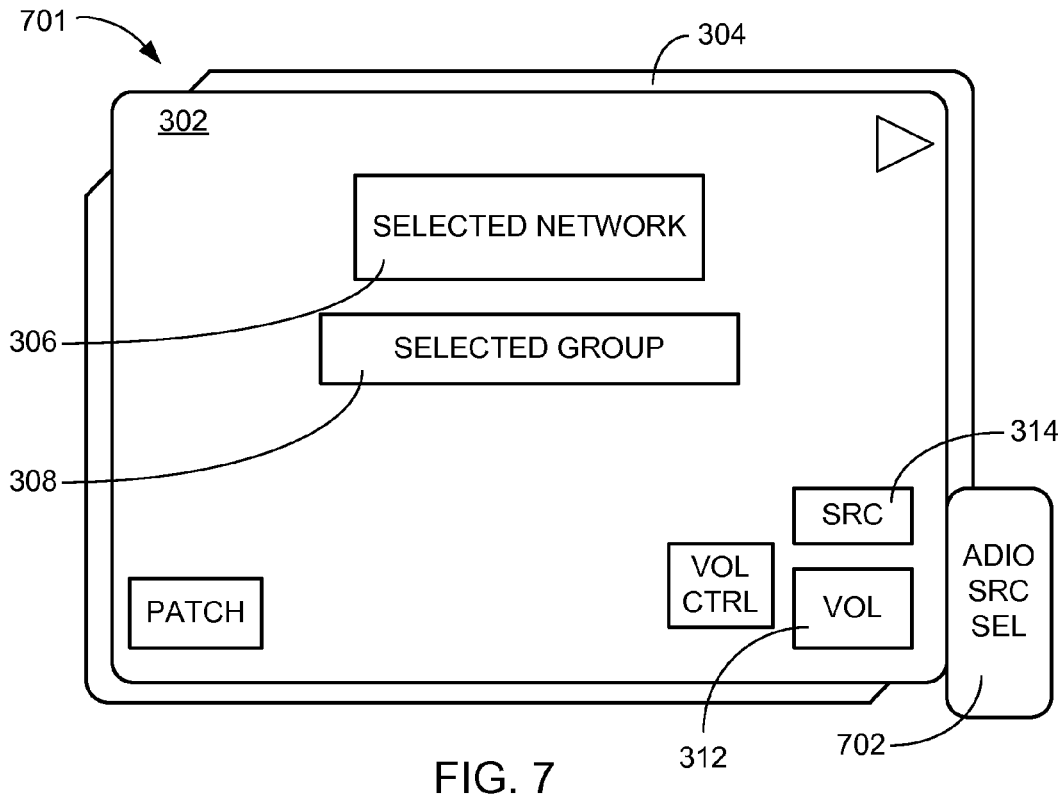
FIG. 7 is an exemplary display of a station channel icon display as displayed by the call center system of FIG. 1 in an idle but interested state of operation.

Referring now to FIG. 7, therein is shown an exemplary display of a station channel icon display 701 as displayed by the call center system 100 of FIG. 1 in an idle but interested state of operation. The exemplary display of the station channel icon display 701 depicts the activation button 302 having the activity frame 304. The selected network 306 and the selected group window 308 may be active on the operator console 104, but can also be viewed on the remote operator console 128, of FIG. 1. By clicking on the source button 314, an audio source select tab 702 can be extended adjacent to the volume display 312.

An interested operator (not shown) can monitor the activity on a channel without actively engaging the call. This type of monitoring can be used for training of performance verification purposes.

Figure 8:
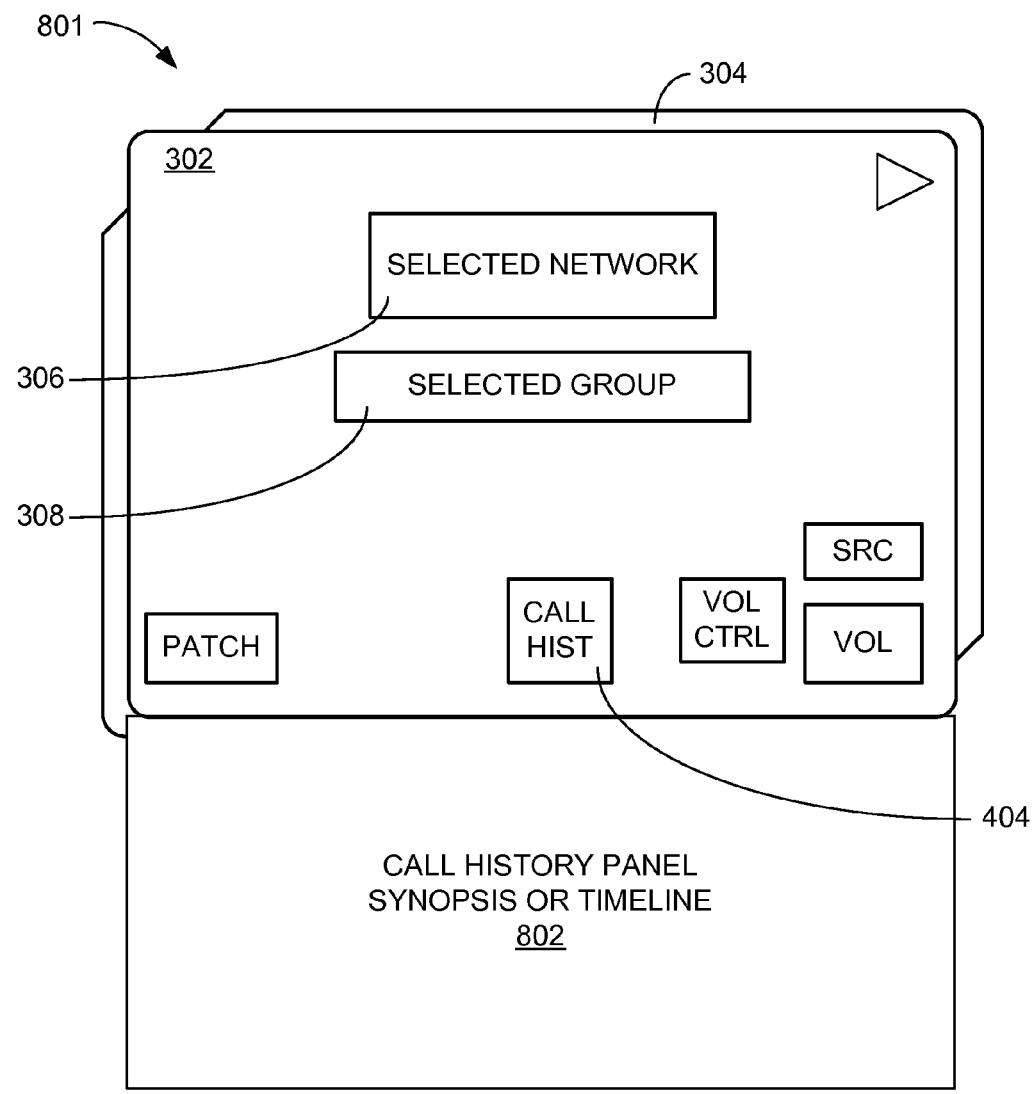
FIG. 8 is an exemplary display of a station channel icon display as displayed by the call center system of FIG. 1 in a call history state of operation.

Referring now to FIG. 8, therein is shown an exemplary display of a station channel icon display 801 as displayed by the call center system 100 of FIG. 1 in a call history state of operation. The exemplary display of the station channel icon display 801 depicts the activation button 302 having the activity frame 304 shaded to indicate the channel is active with a call. The call history button 404 can be clicked to access the call history for the channel. A history display tab 802 can be displayed below the call history button 404.

The history display tab 802 may be in list format or time line format. The list display can indicate all of the call activity of the channel. The time line display can present the sequence of events on a single call, with audio and activity markers.

Figure 9:
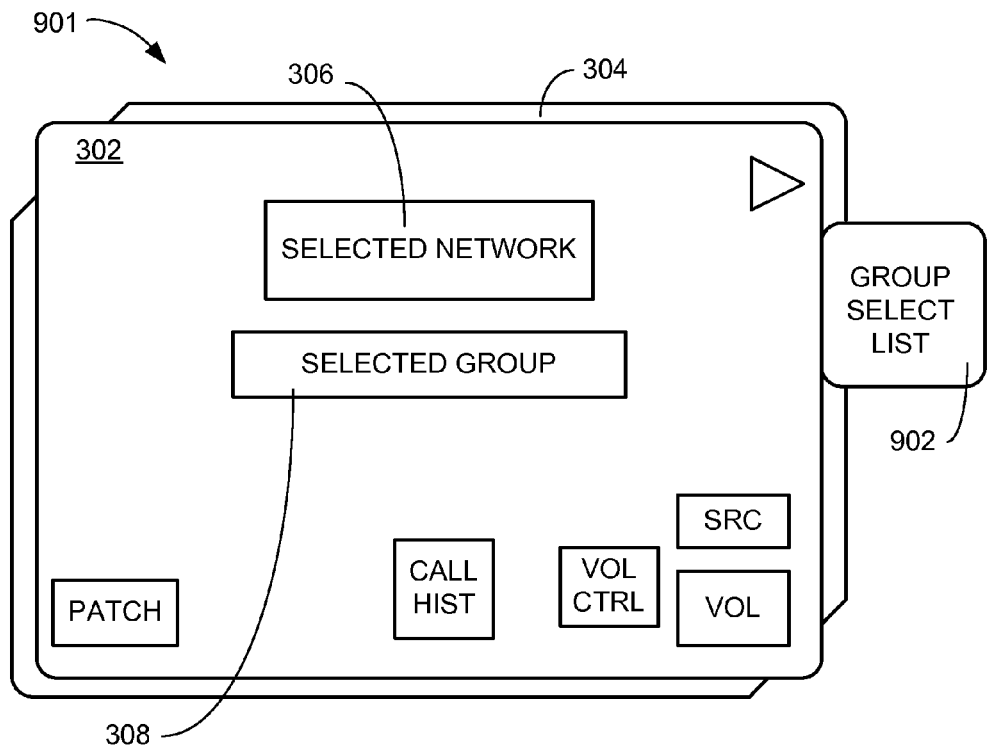
FIG. 9 is an exemplary display of a station channel icon display as displayed by the call center system of FIG. 1 in a group selection state of operation.

Referring now to FIG. 9, therein is shown an exemplary display of a station channel icon display 901 as displayed by the call center system 100 of FIG. 1 in a group selection state of operation. The exemplary display of the station channel icon display 901 depicts the activation button 302 having the activity frame 304 indicating the channel is idle.

The channel can be changed to a different setting by clicking in the selected group window 308. A talking group select tab 902 can present a list of active communication. By clicking a group from the list, the channel is switched to monitor the new combination of the selected network 306 and the selected group window 308. The activity frame 304 does not change from the idle state until a call is accepted by the operator.

Figure 10:
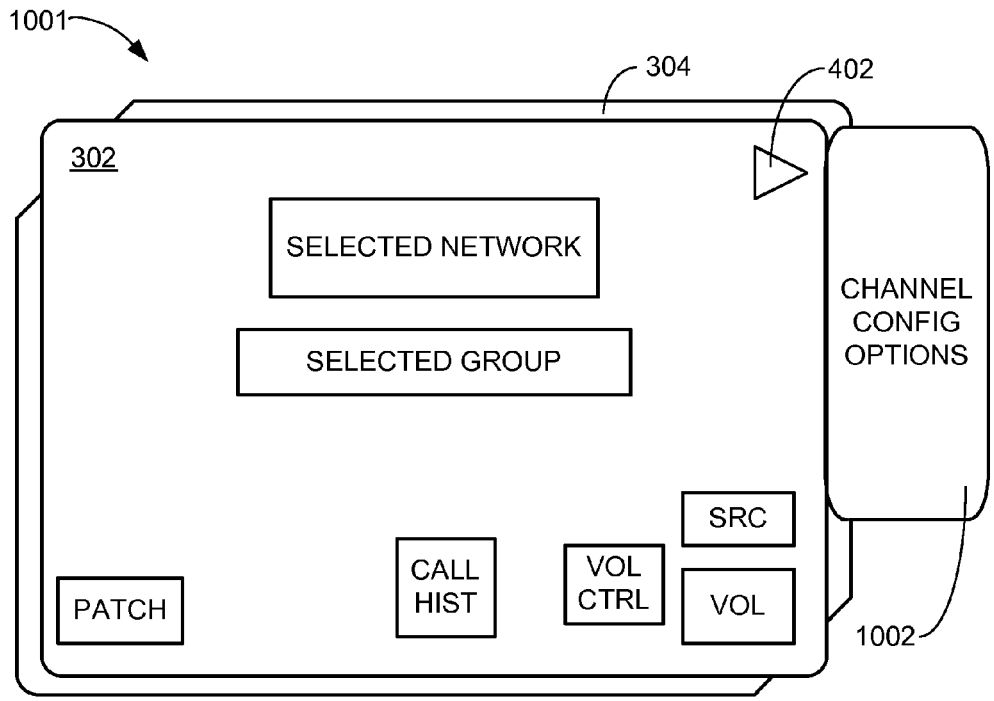
FIG. 10 is an exemplary display of a station channel icon display as displayed by the call center system of FIG. 1 in a channel configuration state of operation.

Referring now to FIG. 10, therein is shown is an exemplary display of a station channel icon display 1001 as displayed by the call center system 100 of FIG. 1 in a channel configuration state of operation. The exemplary display of the station channel icon display 1001 depicts the activation button 302 bordered by the activity frame 304 displaying a color that indicates the channel is idle.

A channel configuration options tab 1002 is accessed by a single click of the configuration button 402. The channel configuration options tab 1002 presents transmit affecting options as a list of the available base station functions that apply to the operator console 104, of FIG. 1. The list of the transmit affecting options can include encryption, analog input/output, repeat, priority marker, squelch, and site intercom. The current state of the transmit affecting options is displayed and can be switched by a single click on the selected option.

It has been discovered that the single click access to all of the available configuration of the options tab 1002 saves time and reduces the workload of the operator (not shown). Since the display shows the available configuration of the operator console 104 by the options tab 1002 in a single list, with the current state indicated for each, the operator can perform a channel set-up of the operator console 104 without traversing several configuration windows and can see the state of all related configuration options.

The activation button 302 will only display the configuration options that are not in the default state. Any item that is switched from the default state will show-up in the activation button 302 as an icon representing that function. Any of the icons that are displayed as a result of the configuration selections, can be reset to default by a single click of the icon in the activation button 302. This approach provides a clean and uncluttered work space for the operator.

Figure 11:
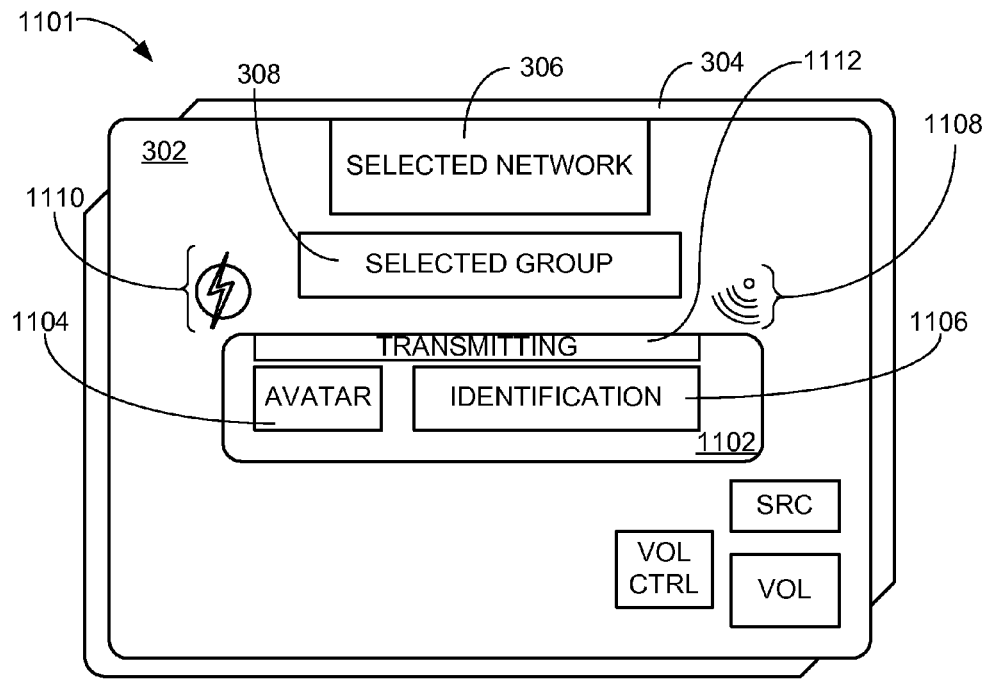
FIG. 11 is an exemplary display of a station channel icon display as displayed by the call center system of FIG. 1 in an active communication state of operation.

Referring now to FIG. 11, therein is shown an exemplary display of a station channel icon display 1101 as displayed by the call center system 100 of FIG. 1 in an active communication state of operation. The exemplary display of the station channel icon display 1101 depicts the activation button 302 bordered by the activity frame 304 displaying a color that indicates the channel is active.

The selected network 306 and the selected group window 308 can be reduced in size and moved to the upper most portion of the activation button 302. An inbound call window 1102 can be opened in the central region of the activation button 302. The inbound call window 1102 can include an avatar 1104 of the person that is calling. In some applications the avatar 1104 may be an actual photo of the person on the call, a picture of a fire truck, a picture of an ambulance, or some other recognizable insignia representing the caller.

Adjacent to the avatar 1104 is an identification shield 1106. The identification shield 1106 can contain badge information for fire and police personnel, a street address for individuals or a GPS location for cell phone users. A call icon 1108 can be displayed to reinforce the call activity in order to help the operator (not shown) recognize the task at hand. All receive icons will appear on the right side of the activation button 302. When the operator is communicating with an external resource through the radio gateway 116, of FIG. 1, a transmitting icon 1110 will appear on the left side of the activation button 302 and will be managed in a fashion similar to the call icon 1108.

When the operator asserts the push to talk button on the operator console 104, of FIG. 1, both the transmitting icon 1110 and a transmitting bar 1112 are displayed in the activation button 302. All outgoing icons will appear on the left side of the activation button 302. Either the transmitting icon 1110 or the call icon 1108 will be present on the activation button 302 but they do not appear at the same time.

When an incoming call is accepted by the operator, the selected network 306 and the selected group window 308 will automatically move out of the center of the activation button 302. The inbound call window 1102 and the call icon 1108 appear in the activation button 302 followed by the avatar 1104 and the identification shield 1106. The identification shield 1106 can include date and time information as well as the identification or location of the caller.

When the call is concluded the inbound call window 1102 will remain in place for a specific time period and will then fade away. When the inbound call window 1102 has vanished the selected network 306 and the selected group window 308 will automatically move back to the center of the activation button 302 and the activity frame 304 will indicate idle by changing color.

Figure 12:
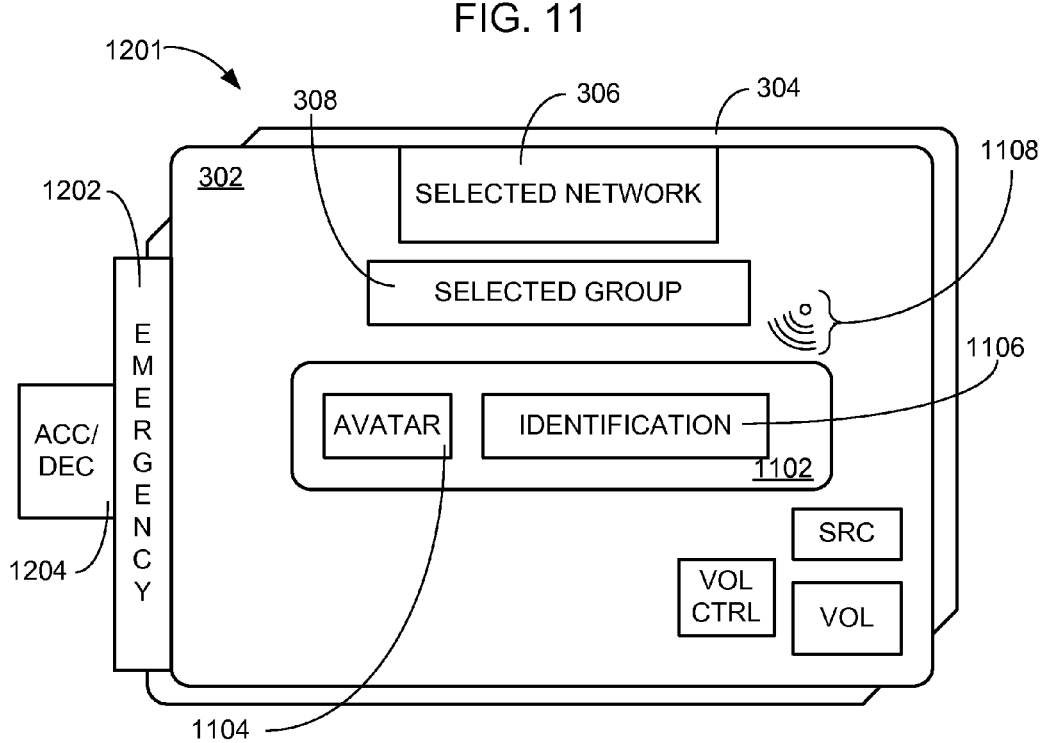
FIG. 12 is an exemplary display of a station channel icon display as displayed by the call center system of FIG. 1 in an emergency alert state of operation.

Referring now to FIG. 12, therein is shown an exemplary display of a station channel icon display 1201 as displayed by the call center system 100 of FIG. 1 in an emergency alert state of operation. The exemplary display of the station channel icon display 1201 depicts the activation button 302 bordered by the activity frame 304 displaying a color that indicates the channel is selected with an inbound emergency call. The urgency of the call is enforced by an emergency tab 1202 that appears on the left side of the activation button 302.

For the emergency call, the selected network 306 and the selected group window 308 will automatically move out of the center of the activation button 302. The inbound call window 1102 and the call icon 1108 appear in the activation button 302 followed by the avatar 1104 and the identification shield 1106. The identification shield 1106 can include date and time information as well as the identification or location of the caller having the emergency.

When an inbound emergency call is presented an audible alarm will sound at all of the operator consoles 104, of FIG. 1, that have been presented with the call. An accept/decline tab 1204 is presented to the left of the emergency tab 1202. When an operator (not shown) clicks on the accept portion of the accept/decline tab 1204, the audible alarm will be silenced for all of the operator consoles 104 that have the indication of the emergency call.

The emergency tab 1202 remains displayed on all of the operator consoles 104. When a transmission out on the channel having the emergency call is activated, the emergency tab 1202 will be removed from all of the operator consoles 104. If any of the operators pushes the decline portion of the accept/decline tab 1204, the emergency tab 1202 is reset for all of the operator consoles 104 that have it pending.

The same version of the emergency tab 1202 will be presented to the operator consoles 104 regardless of the source transmission type, which might include standard analog, conventional radios, or voice over internet protocol, digital calls. A consistent look and feel is always presented to the operator in order to minimize the burden on the operator.

Figure 13:
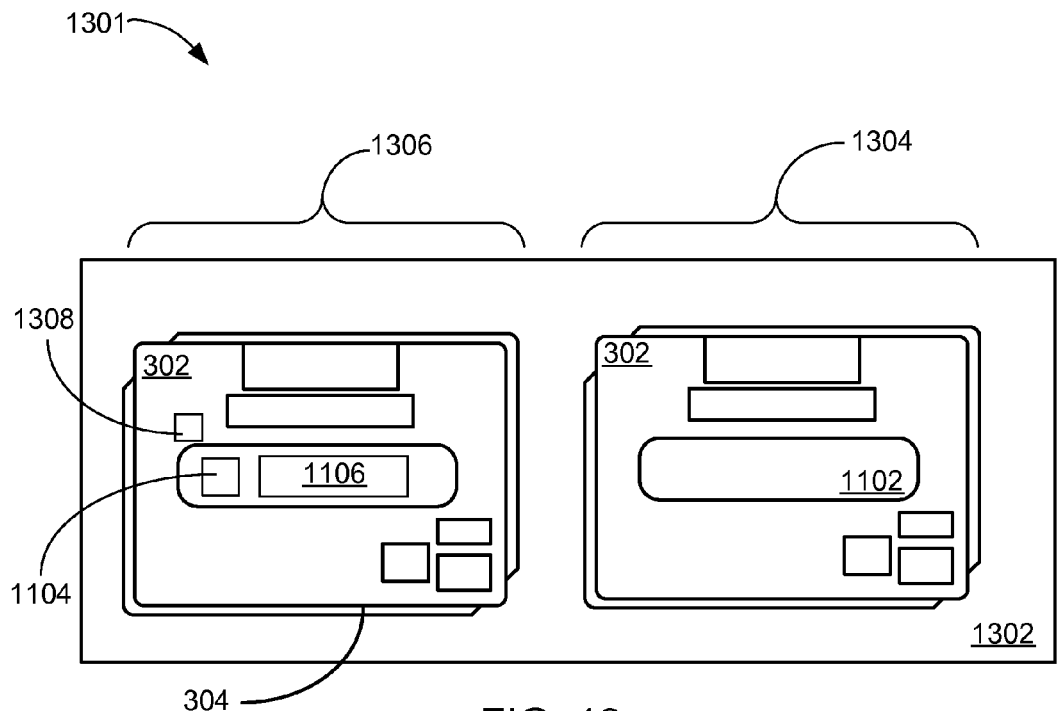
FIG. 13 is an exemplary display of an operator console as displayed by the call center system of FIG. 1 in a parallel operator state of operation.

Referring now to FIG. 13, therein is shown an exemplary display of the operator console 104 as displayed by the call center system 100 of FIG. 1 in a parallel operator state of operation. The exemplary display of the operator console 104 depicts a display panel 1302 having a primary instance 1304 and a secondary instance 1306 of the activation button 302. This configuration can provide parallel operator support, which allows the primary operator (not shown) to monitor and intervene on the activity of a secondary operator (not shown) or vice versa. The monitoring by the primary operator may be used for training purposes, performance verification, or to assure coverage during peak activity periods.

The primary instance 1304 has the activity frame 304 that is used to assist the operator in determining the state of the primary instance 1304. The activity frame 304 can be presented in different colors to indicate the state of the primary instance 1304. As an example the activity frame 304 can be a dark blue color for the idle state, a green color for the selected state, a light blue color for the active communication state, or red for the emergency state. The selection of the colors and the associated state are established by a system administrator (not shown) and are uniform for all of the operator consoles 104, of FIG. 1, in the call center 102.

All of the controls and operations of the activation button 302 are present in the primary instance 1304 and the secondary instance 1306. It is understood that having the primary instance 1304 and the secondary instance 1306 is an example only and any number of additional instances of the activation button 302 is possible.

In a parallel operator state, the instances of the primary instance 1304 and the secondary instance 1306 are replicated on two of the operator consoles 104 or on one of the operator console 104 and the remote operator console 128, of FIG. 1. This flexibility allows rapid redeployment during natural disasters that could impact the call center 102 of FIG. 1.

In the parallel operator state of operation, the primary instance 1304 operates as defined for the Activation button 302 and the secondary instance 1306 is operated by the secondary operator. In time of need the primary operator or the secondary operator can take over operation of both the primary instance 1304 and the secondary instance 1306. This can be executed by activating the elements in the secondary instance 1306 or the resources can be dragged from the secondary instance 1306 to the primary instance 1304.

When the secondary operator is transmitting in response to an inbound call, an operator icon 1308 takes the place of the transmitting icon 1110, of FIG. 11. The inbound call window 1102 can include the avatar 1104 showing the secondary operator and the identification shield 1106 can display the name and station information of the secondary operator. In the event the primary operator intervenes, the avatar 1104 and the identification shield 1106 would reflect the information for the primary operator.

By way of example both the primary instance 1304 and the secondary instance 1306 are shown processing an inbound call. During the parallel operator state, any of the possible states described for the activation button 302 can be present on either the primary instance 1304 or the secondary instance 1306.

Figure 14:
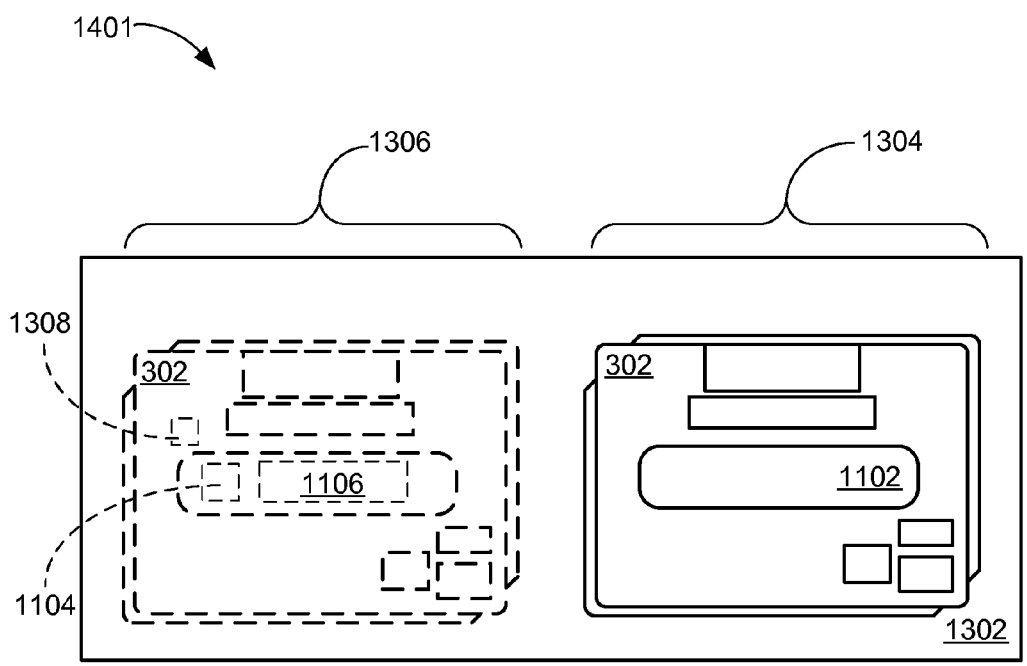
FIG. 14 is an exemplary display of an operator console as displayed by the call center system of FIG. 1 in a parallel operator resource time-out state of operation.

Referring now to FIG. 14, therein is shown an exemplary display of an operator console 1401 as displayed by the call center system 100 of FIG. 1 in a parallel operator resource time-out state of operation. The exemplary display of the operator console 1401 depicts the display panel 1302 having the primary instance 1304 and the secondary instance 1306 of the activation button 302. This configuration can provide parallel operator support, which allows the primary operator (not shown) to monitor and intervene on the activity of a secondary operator (not shown).

When the secondary operator is transmitting in response to an inbound call, the operator icon 1308 takes the place of the transmitting icon 1110, of FIG. 11. The inbound call window 1102 can include the avatar 1104 showing the secondary operator and the identification shield 1106 can display the name and station information of the secondary operator. In the event the primary operator intervenes, the avatar 1104 and the identification shield 1106 would reflect the information for the primary operator.

A system timer (not shown) can be established for the secondary instance 1306. If left unattended the secondary instance 1306 will completely fade away, thereby terminating the parallel operator state. If however the primary operator clicks on an area of the secondary instance 1306, the timer is reset and the secondary instance 1306 is restored. The restoration of the secondary instance 1306 maintains the parallel operator state. As with other aspects of the present invention, a single click is all that is required to access a resource or change states of a function available to the primary operator.

Figure 15:
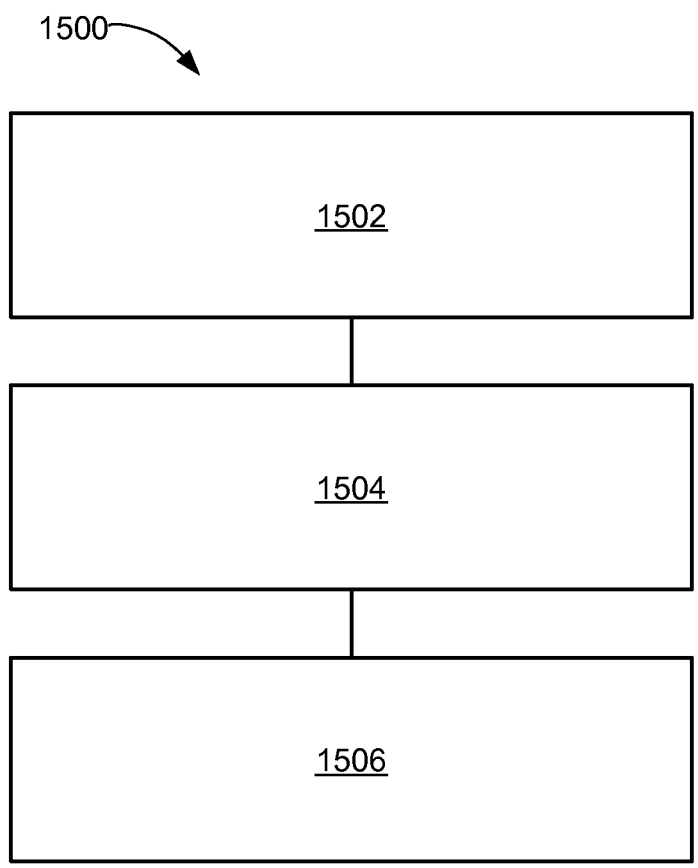
FIG. 15 is a flow chart of a method of operation of the call center system in a further embodiment of the present invention.

Referring now to FIG. 15, therein is shown a flow chart of a method 1500 of operation of the call center system 100 in a further embodiment of the present invention. The method 1500 includes: providing an operator console having a display in a block 1502; instantiating an activation button, on the display of the operator console, including: coloring an activity frame around the activation button, selecting a selected network in the activation button, and presenting an inbound call window on the activation button in a block 1504; and activating a transmitting icon includes establishing a contextual awareness of interactive data elements and operational actions in a block 1506.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization.

One aspect of the present invention is to only display information and options relevant to the current state of call processing. A station channel icon display in the following paragraphs shows how the invention has been implemented. An administrator can establish an environment that allows an operator to manage only a limited scope of calls without being concerned about all possible channels. The approach of the present invention is to provide only the resources needed by the operator to manage the immediate state of the communication process. This approach reduces the screen clutter and simplifies the operational states.

Another aspect of the present invention is to only display collections of elements needed by that particular operator. The collections of elements are determined by logical relationships between external resources and the operator.

Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a call center system comprising:
   providing an operator console having a display;
   instantiating an activation button, on the display of the operator console, including:
      coloring an activity frame around the activation button, selecting a selected network in the activation button, and presenting an inbound call window on the activation button; and
   activating a transmitting icon includes establishing a contextual awareness of interactive data elements and operational actions including displaying transmit affecting options having a priority marker obscuring a portion of the activity frame for indicating a transition in the state of the activation button.

2. The method as claimed in claim 1 wherein observing the activity frame including:
   coloring a first color in an idle state;
   coloring a second color in a selected state; and
   coloring a third color in an emergency state.

3. The method as claimed in claim 1 further comprising linking a patch by single-clicking a patch button on the activation button.

4. The method as claimed in claim 1 wherein activating the transmitting icon includes illuminating a transmitting bar.

5. The method as claimed in claim 1 further comprising coordinating an emergency service including displaying an emergency tab, in the activation button, set by the inbound call window.

6. A method of operation of a call center system comprising:
   providing an operator console having a display including linking a plurality of the operator console;
   instantiating an activation button, on the display of the operator console, with a primary instance for the operator console and a secondary instance for the plurality of the operator console, including:
      coloring an activity frame around the activation button, selecting a selected network in the activation button, and presenting an inbound call window on the activation button; and
   activating a transmitting icon includes establishing a contextual awareness of interactive data elements and operational actions in response to the inbound call window including displaying transmit affecting options having a priority marker obscuring a portion of the activity frame for indicating a transition in the state of the activation button.

7. The method as claimed in claim 6 wherein observing the activity frame including:
   coloring a first color in an idle state;
   coloring a second color in a selected state; and
   coloring a third color in an emergency state including resetting an emergency tab in the plurality of the operator console by activating the transmitting icon in the operator console.

8. The method as claimed in claim 6 further comprising linking a patch by single-clicking a patch button on the activation button including adding or deleting a patch by single-clicking a patch select button.

9. The method as claimed in claim 6 wherein activating the transmitting icon includes illuminating a transmitting bar and turning off a call icon.

10. The method as claimed in claim 6 further comprising coordinating an emergency service including:
    detecting an emergency tab, in the activation button, set by the inbound call window; and
    responding to an emergency alert, from the operator console, for communicating with a vehicle including resetting the emergency tab in the plurality of the operator console including setting the transmitting icon in the secondary instance of the plurality of the operator console.

11. A call center system comprising:
    an operator console having a display;
    a call exchange mechanism linked to the operator console for delivering an inbound call;
    a logger coupled to the operator console for generating a call history; and
    a radio gateway coupled to the operator console for establishing an audio patch by the call exchange mechanism patched to the radio gateway includes patch affecting options including an activation button having an activity frame on the display and a portion of the activity frame obscured by a priority marker for indicating a transition in the state of the activation button.

12. The system as claimed in claim 11 further comprising a local area network between the operator console and the logger.

13. The system as claimed in claim 11 further comprising a central processing unit coupled to the operator console for generating an activation button on the display.

14. The system as claimed in claim 11 further comprising a router coupled to the operator console.

15. The system as claimed in claim 11 wherein the radio gateway coupled to the operator console.

16. The system as claimed in claim 11 further comprising:
    a remote operator console coupled to the operator console through a wide area network.

17. The system as claimed in claim 16 further comprising:
    a local area network between the operator console and the logger; and
    a remote local area network between the remote operator console and the operator console.

18. The system as claimed in claim 16 further comprising a central processing unit coupled to the operator console for generating an activation button on the display includes a secondary instance of the activation button displayed on the remote operator console.

19. The system as claimed in claim 16 further comprising a router coupled to the operator console and a remote router coupled to the remote operator console.

20. The system as claimed in claim 16 wherein the radio gateway coupled to the operator console includes a remote router coupled between a remote radio gateway and the operator console.

* * * * *